United States Patent Office 3,232,938
Patented Feb. 1, 1966

3,232,938
6-ALKYLMERCAPTOPURINES
George H. Hitchings, Yonkers, Gertrude B. Elion, Bronxville, and Irving Goodman, White Plains, N.Y., assignors to Burroughs Wellcome & Co. (U.S.A.) Inc., Tuckahoe, N.Y., a corporation of New York
No Drawing. Filed Aug. 2, 1962, Ser. No. 214,205
5 Claims. (Cl. 260—252)

This application is a continuation-in-part of United States patent applications, Serial No. 375,819, filed on August 21, 1953; Serial No. 533,886, filed on September 12, 1955; and Serial No. 853,683, filed on November 18, 1959, all of which are now abandoned.

The present invention relates to substituted 6-mercaptopurines. The analogous 6-mercaptopurine, described in U.S. Patent 2,697,709, has been definitely established as a drug useful in the treatment of leukemia and has been shown to be a useful inhibitor of cell division, particularly with regard to providing temporary remissions of acute leukemia. The main object of the present invention is to provide new compositions which modify the actions of these mercaptopurines so as to extend their range of usefulness. The use of both of the unsubstituted 6-mercaptopurines is somewhat restricted because of the limitations imposed by toxic side effects. It has now been found that certain S-substituted derivatives have a greater therapeutic index, including lower toxicity, and as a result an extended range of usefulness. The compounds have been proven to have anticancer activity in rodents (note H. E. Skipper et al., Cancer Research, vol. 19, No. 4, pp. 425–37, May 1959). The compounds, particularly the higher members of the series where R in the formula below has a value of from 4 to 7, also are shown to have activity in assisting seed germination.

The compositions of this invention may be formulated by the structure:

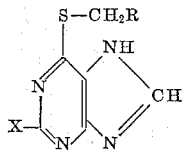

wherein X is selected from the class consisting of hydrogen and the amino group, and R is selected from the class consisting of the alkyl radicals having from two to seven carbon atoms. The alkyl radicals attached to the sulfur atom may be straight chain or branched alkyl radicals and include straight and branched chain propyl, butyl, amyl, hexyl and heptyl substituents found to have effective and prolonged activity at low toxicity levels.

The invention likewise contemplates a novel process for the manufacture of the compounds of the above group in high yield.

The most useful method of preparation of these new derivatives is by the reaction of the mercaptopurine with the halide of the desired substituent radical in the presence of a suitable acceptor of the acid so formed.

The following examples illustrates exemplary embodiments of the invention, its scope, however, is defined in the claims.

EXAMPLE 1

2-amino-6-n-propylmercaptopurine

To a solution of 4 g. of 2-amino-6-mercaptopurine in 24 ml. of 2 N sodium hydroxide were added 2.4 ml. of propyl iodide and 150 ml. of aqueous methanol. The solution was diluted with 125 ml. of water and heated in a sealed tube at 120° for 17 hours. The 2-amino-6-n-propylmercaptopurine crystallized on standing in the cold. The product was purified by recrystallization from hot water and melted at 189–190°.

EXAMPLE 2

2-amino-6-n-butylmercaptopurine 2-amino-6-n-butylmercaptopurine was prepared substantially according to the directions of Example 1, using 2.75 ml. of n-butyliodide in place of the propyl iodide. It melted at 201–202°.

EXAMPLE 3

6-butylmercaptopurine 6-n-butylmercaptopurine was prepared according to the directions of Example 2 using 4 g. of 6-mercaptopurine hydrate. It melted at 150–151°.

EXAMPLE 4

2-amino-6-heptylmercaptopurine

A mixture of 5 g. of 2-amino-6-mercaptopurine, 7.45 g. of 1-iodoheptane, 4.6 g. of anhydrous potassium carbonate and 25 ml. of dimethylformamide was heated at 70°, with stirring, for 5 hours. The reaction mixture was poured into 100 ml. of water and the acidity adjusted to pH 5 by the addition of acetic acid. The crude precipitate (7.9 g.) was collected and purified by recrystallization from methanol. 2-amino-6-heptylmercaptopurine melts at 148–149°.

What we claim is:

1. A compound of the formula:

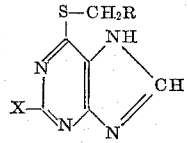

wherein X is selected from the class consisting of hydrogen and the amino group, and R is selected from the class consisting of the alkyl radicals having from four to seven carbon atoms.
2. 2-amino-6-n-butylmercaptopurine.
3. 2-amino-6-hexylmercaptopurine.
4. 2-amino-6-n-amylmercaptopurine.
5. 2-amino-6-n-heptylmercaptopurine.

References Cited by the Examiner

FOREIGN PATENTS 557,467    5/1958    Canada.

NICHOLAS S. RIZZO, Primary Examiner.

WALTER A. MODANCE, Examiner.